A. L. PUTNAM.

VEHICLE WHEEL.

APPLICATION FILED MAR. 26, 1920.

Reissued May 16, 1922. 15,358.

Inventor

Alden L. Putnam

By Whittemore Hulbert & Whittemore

Attorneys

UNITED STATES PATENT OFFICE.

ALDEN L. PUTNAM, OF DETROIT, MICHIGAN, ASSIGNOR, BY MESNE ASSIGNMENTS, TO DETROIT PRESSED STEEL COMPANY, OF DETROIT, MICHIGAN, A CORPORATION OF DELAWARE.

VEHICLE WHEEL.

15,358. Specification of Reissued Letters Patent. Reissued May 16, 1922.

Original No. 1,249,826, dated December 11, 1917, Serial No. 108,801, filed July 12, 1916. Application for reissue filed March 26, 1920. Serial No. 369,120.

*To all whom it may concern:*

Be it known that I, ALDEN L. PUTNAM, a citizen of the United States of America, residing at Detroit, in the county of Wayne and State of Michigan, have invented certain new and useful Improvements in Vehicle Wheels, of which the following is a specification, reference being had therein to the accompanying drawings.

The invention relates to vehicle wheels and has for its object the obtaining of a construction which permits of both demounting of the wheel from the hub and removing the rim for engagement with the tire. It is also an object to obtain a simple inexpensive construction and one possessing both strength and lightness.

Figure 1:
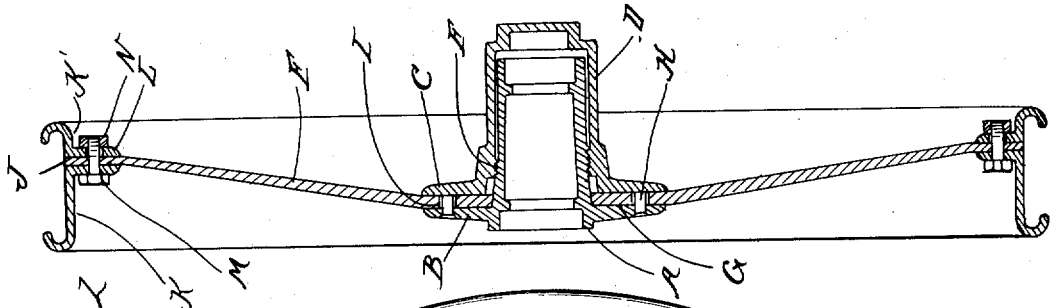
Figure 1 is a section through the wheel in the plane of the hub.
Figure 2:
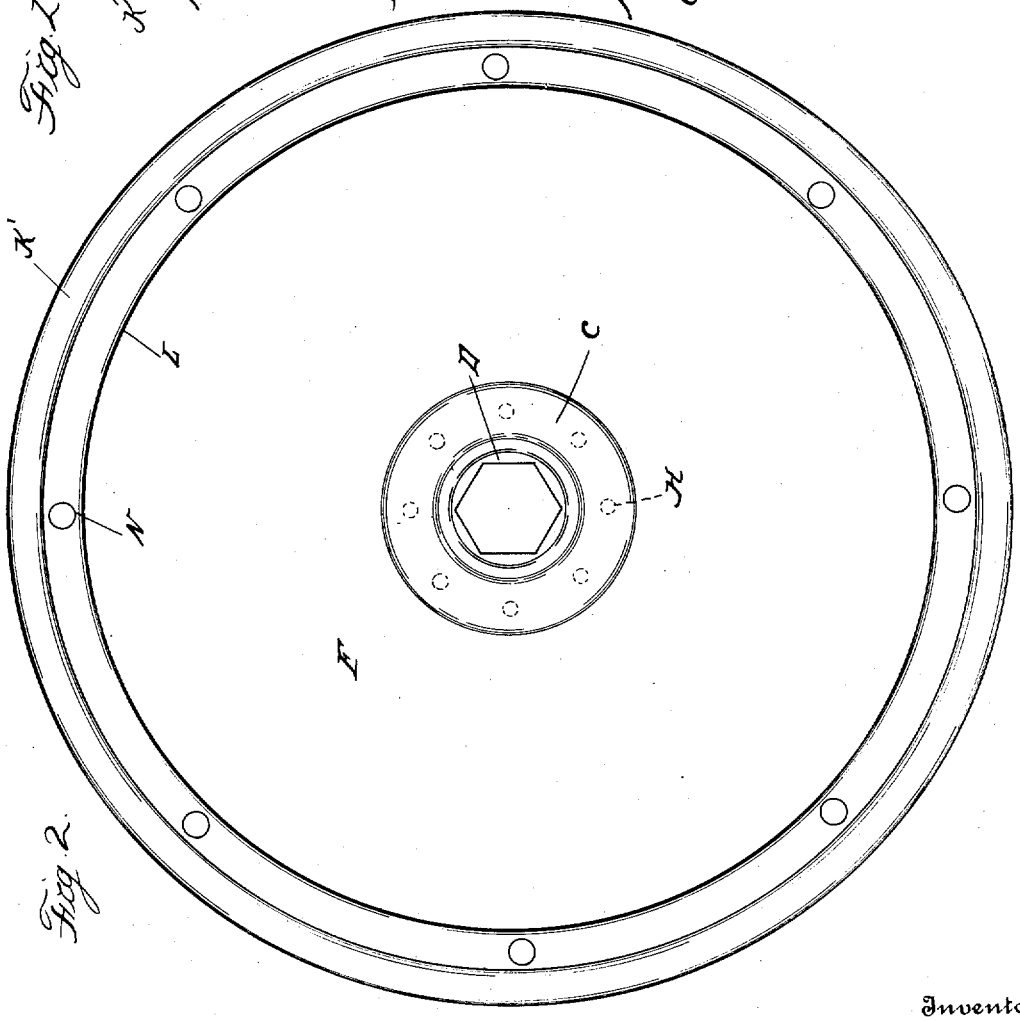
Figure 2 is a side elevation of the wheel.

A is a hub provided with a peripheral flange B. C is a detachable flange for cooperating with the flange B to form a clamp, said flange being preferably formed integral with a cap member D for the hub, and having a threaded engagement therewith at E. F is a metallic disk, preferably of dished form, being apertured to fit over the hub A and having a central portion G parallel to the flange B and adapted to be clamped thereagainst by the flange C. H are a series of studs secured to the flange B and projecting laterally therefrom, said studs being engageable with corresponding apertures 1 in the portion G of the disk. The disk F is of varying gage, being of greatest thickness at the center and tapering from the portion G to a portion in proximity to its periphery. At the periphery is an annular portion J which is in a plane parallel to the plane of the portion G. K and K′ are rim sections, each being provided with an inwardly extending flange L arranged parallel to the portion J of the disk, said flanges being upon opposite sides of said disk. M are clamping bolts passing through registering apertures in the flanges L and J and having cooperating clamping nuts N.

With the construction as described, to mount the tire upon the rim it is only necessary to remove the bolts M and detach one of the sections, such as K′. The tire case may then be slipped upon the other section of the rim, after which the section K′ is replaced and clamped by the engagement and tightening of the bolts M and nuts N.

To mount the wheel upon the hub, the cap D is removed, the disk is slipped over the hub A and the studs H are engaged with the apertures I. The cap D is then replaced and tightened by screwing on the hub, which will cause the flange C to clamp the portion G of the disk against the flange B. By reason of the dished form of disk, the outer portion J thereof is offset in relation to the central portion G, and the rim sections K and K′ are therefore preferably of unequal width, the section K being greater in width than the section K′.

It will be also noted that the disk has a portion of its dished surface between the hub and the rim which approaches the central plane of rotation or plane of impact as it extends radially inward. This has the advantage of imparting greater strength and also a slight degree of resiliency to the wheel.

What I claim as my invention is:—

1. A vehicle wheel, comprising a dished disk having a central portion parallel to the plane of rotation and a peripheral portion also parallel to the plane of rotation and offset from said central portion, means for clamping the central portion to a wheel hub, a tire rim, and means for detachably clamping said tire rim to the peripheral portion of said disk.

2. A vehicle wheel, comprising a dished disk having central and peripheral portions parallel to the plane of rotation and offset in relation to each other, the gage of the central portion being greater than that of the peripheral portion and the gage of the intermediate portion tapering from the one to the other, means for detachably securing the central portion to a wheel hub, and means for securing the peripheral portion to a tire rim.

3. A vehicle wheel, comprising a dished disk having central and peripheral portions parallel to the plane of rotation, the gage of the central portion being greater than that of the peripheral portion and the intermediate portion being of tapering gage from the one to the other, a hub having cooperating clamping flanges parallel to said central portion of the disk and arranged upon opposite sides thereof, and a rim formed in cooperating sections having inwardly-extending securing flanges clamped upon opposite sides of said peripheral portion.

4. In a vehicle wheel, a dished disk having a central portion and a peripheral portion parallel to the plane of rotation, the central portion being of greater gage than the peripheral portion and the intermediate portion tapering from the one to the other, means for clamping the central portion to a vehicle hub, and a rim formed of cooperating sections arranged upon opposite sides of said peripheral portion of the disk, one of said sections being of greater width than the other to compensate for the dishing of the disk.

5. In a vehicle wheel, a dished disk having its thickness gradually reduced outwardly from the hub, means for clamping the central portion of said disk to a vehicle hub and a rim formed of cooperating sections arranged upon opposite sides of said disk, one of said sections being of greater width than the other to compensate for the dishing of the disk.

6. A vehicle wheel comprising a hub, a rim, and a dished disk of a cross section tapering outwardly from the hub, engaging the hub and rim on opposite sides respectively of the central plane of rotation or plane of impact, the ratio of the thickness to the radial length of said disk imparting thereto relative flexibility.

7. A vehicle wheel comprising a hub, a rim, and a dished disk of a cross section tapering outwardly from the hub, engaging the hub and rim on opposite sides respectively of the central plane of rotation or plane of impact, the peripheral portion of said disk adjacent to said rim being reinforced.

8. A vehicle wheel comprising a hub, a rim, and a dished disk extending therebetween and secured thereto, said disk being of a cross section tapering from the hub towards the rim and crossing the central plane of rotation or plane of impact, the ratio of the thickness to the radial length of said disk imparting thereto relative flexibility.

9. A vehicle wheel comprising a hub, a rim and a dished disk of outwardly tapering section extending therebetween and secured thereto, said disk having a portion of its dished surface approaching the central plane of rotation or plane of impact as it extends radially inward, the ratio of the thickness to the radial length of said disk imparting thereto relative flexibility.

10. The combination with a vehicle wheel hub, of a wheel engaging said hub, comprising a rim for supporting a pneumatic tire, a dished disk peripherally secured to said rim and having a portion crossing the plane of impact, the ratio of the thickness to the radial length of said disk imparting relative flexibility thereto.

11. The combination with a vehicle wheel hub, of a wheel demountably engaging said hub comprising a rim for supporting a pneumatic tire, a dished disk of outwardly tapering cross section peripherally secured to said rim and having a portion crossing the plane of impact, and means for detachably securing the central portion of said disk to said hub, the ratio of the thickness to the radial length of said disk imparting relative flexibility thereto.

12. The combination with a vehicle wheel hub, of a rim demountably engaging said hub, comprising a rim for supporting a pneumatic tire, a pressed sheet metal dished disk of outwardly tapering cross-section peripherally secured to said rim on one side of the plane of impact and having a portion crossing said plane of impact, and means for engaging the central portion of said disk with said wheel hub, the ratio of the thickness to the radial length of said disk imparting relative flexibility thereto.

13. The combination with a vehicle wheel hub, of a wheel demountably engaging said hub comprising a rim for supporting a pneumatic tire, a dished disk peripherally secured to said rim and lying wholly within the side boundaries of the rim, said disk having a portion crossing the plane of impact, and means at the center of the disk for detachably engaging said hub, the ratio of the thickness to the radial length of said disk imparting relative flexibility thereto.

14. A vehicle wheel comprising a hub, a rim adapted for supporting a pneumatic tire and a dished disk secured to and extending therebetween, the ratio of the thickness to the radial length of said disk imparting relative flexibility thereto and the peripheral portion of said disk being reinforced to impart relative rigidity to said portion, and a portion of said disk crossing the plane of impact.

In testimony whereof I affix my signature at Detroit, Wayne County, Michigan, this 19th day of March, 1920.

ALDEN L. PUTNAM.